Patented Apr. 14, 1942

2,279,589

UNITED STATES PATENT OFFICE 2,279,589

CHEMICAL HEATING COMPOSITION

Samuel Grant, Chicago, Ill., assignor, by mesne assignments, to Products Development, Inc., Chicago, Ill., a corporation of Illinois No Drawing. Application January 2, 1941,
Serial No. 372,946

8 Claims. (Cl. 44—3)

This invention relates generally to an exothermic chemical heating composition and more particularly to a composition suitable for producing heat in the permanent waving of hair.

The object of this invention is to provide an improved composition which will react exothermically upon the application of moisture thereto, but which will be extremely stable and inactive under ordinary atmospheric conditions of temperature and humidity.

A collateral object of the present invention is to provide a heating composition which will evolve ammonia gas during the utilization thereof.

Still a further object of the present invention is to provide a chemical heating composition which will produce the necessary heat for the permanent waving of hair without the utilization of any of the so-called oxidizing materials, such as the chlorates.

Still a further object of the present invention is to provide a chemical heating composition which will consist of several materials neither harmful nor deleterious to the skin or hair under any conditions.

Further objects of the present invention are to provide a heating composition which will have as its end products no discolored matter and which will be easily assembled and handled during the operation of permanently waving hair and further will be adapted to be simply disposed of.

With the foregoing and other objects in view which will appear as the description proceeds, the invention consists of certain novel combinations of materials and chemicals advantageously combined and mixed in a manner hereinafter fully described and pointed out in the appended claims, it being understood that various changes in the form, proportions and minor details of the composition may be made without departing from the spirit or sacificing any of the advantages of the invention.

In order to promote a more complete understanding of my invention and its mode of operation, I have described below the complete details of a preferred embodiment of my invention from which the advantages and features thereof may be more readily appreciated.

Generally, my new composition consists of a mixture of powdered aluminum or some such metal, an alkaline earth hydrate, such for example as calcium or barium hydroxide, a nitrate such as sodium nitrate or potassium nitrate, a salt of a strong base, such as for example, an alkali carbonate or phosphate such as sodium carbonate or tri-sodium phosphate, a quantity of inert filler, such as clay, talc, fuller's earth or clay.

The resultant mixture is very dry and stable and comprises no materials which are not easily obtainable and extremely economical to keep and to handle. Because of this, chemical heating pads may be formed by disposing quantities of my mixture in a suitable sachet under ordinary conditions, and same may be stored indefinitely without special packing.

The general proportions which I use are as follows:

|  | Per cent |
|---|---|
| Metal | 20 to 50 |
| Nitrate | 5 to 30 |
| Alkaline earth hydrate | 5 to 30 |
| Salt of strong base and weak acid | 5 to 20 |
| Inert filler | 20 to 50 |

An example of a composition with which I have found temperatures in the so-called hair waving zone and as high as 260° F. have been reached is as follows:

|  | Per cent |
|---|---|
| Clay | 30 |
| Aluminum | 30 |
| Calcium hydroxide | 10 |
| Sodium nitrate | 20 |
| Sodium carbonate | 10 |
| or |  |
| Tri-sodium phosphate | 10 |

Percentages being by weight.

When water is added to the above mixture, generally three types of reaction occur, each of which evolves heat and each of which produces as its end products materials which are not discolored, deleterious, or harmful.

First, the calcium hydroxide reacts with the sodium carbonate or tri-sodium phosphate to produce sodium hydroxide and calcium carbonate or tri-calcium phosphate. The calcium carbonate is, of course, the familiar boiler scale and precipitates out, or if the tri-calcium phosphate is formed it precipitates out, being soluble only in acidic solutions. The solution of my composition is, of course, highly alkaline. Sodium hydroxide has a high heat of formation and does not remain in its state, but continues to react with other ingredients of the composition. The chemical equations of the above reactions are as follows:

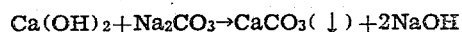

$Ca(OH)_2 + Na_2CO_3 \rightarrow CaCO_3(\downarrow) + 2NaOH$

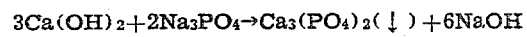

$3Ca(OH)_2 + 2Na_3PO_4 \rightarrow Ca_3(PO_4)_2(\downarrow) + 6NaOH$

Second, the sodium hydroxide reacts with the aluminum in the presence of the water to produce sodium aluminate and free hydrogen gas. This is accompanied by a liberation of heat. The chemical equation is as follows:

$$6NaOH + 2Al \rightarrow 2Na_3AlO_3 + 3H_2$$

This second reaction controls the type of metal to be used with my new composition. This metal may be aluminum, zinc, tin or any of the other metals which are amphoteric, i. e., which will combine with other elements in positive or negative valency. Aluminum for example forms aluminates, zinc forms zincates, etc.

Third, the hydrogen of the above reactions reacts with the nitrate of the composition evolving ammonia gas and also liberating a large quantity of heat. The equation is generally as indicated below:

$$\ldots + 3H^+ + NO^-_3 \rightarrow NH_3 \uparrow + \ldots$$

Each of the above reactions produces a quantity of heat and all three combine to furnish the heat necessary to treat a tress of hair and thereby impart a permanent wave thereto. Further, the ammonia gas evolved in the last referred to reaction is a desirable feature of my new composition since it serves to condition the hair and augment the alkalizing solution with which the hair is treated prior to the permanent waving thereof as is familiar to those skilled in this particular art.

An important feature of my invention is the fact that the end products need not be specially wrapped or prepared for disposal of the pads after being used. The products are all substantially inactive and there is no danger of spontaneous combustion or the like occurring in the disposal containers.

The illustrations hereinabove referred to are merely for the purposes of explanation and not intended to limit the invention in any way. It should be manifest at this point that the details and proportions described herein are capable of wide variation within the purview of my invention.

What I claim and desire to secure by Letters Patent of the United States is:

1. An exothermic composition for use in imparting a permanent wave to a preformed tress of hair upon the addition thereto of moisture comprising a stable mixture of a comminuted amphoteric metal, from the group between the alkaline earth metals and hydrogen in the electromotive force series of metals, a nitrate, an alkaline earth metal hydrate, a salt which will produce a basic ion in solution, and a filler material.

2. An exothermic chemical composition adapted to be used in imparting a permanent wave to a preformed tress of hair, comprising a mixture of comminuted aluminum, an alkali nitrate, a salt of a strong base and a weak acid, an alkaline earth metal hydrate, and an inert filler material.

3. An exothermic chemical composition which upon the addition of moisture thereto will evolve sufficient heat to impart a permanent wave to a preformed tress of hair comprising a mixture of chemicals which upon reaction with one another will produce a strong alkali solution, an amphoteric metal from the group between the alkaline earth metals and hydrogen in the electromotive force series of metals adapted to react with said strong alkali solution to thereby produce free hydrogen ions, and a nitrate ion producing material adapted to supply nitrogen ions for combination with said hydrogen ions to produce thereby free ammonia gas.

4. An exothermic chemical composition for use in imparting a wave to a preformed tress of hair upon the addition of moisture thereto, comprising a powdered mixture of an amphoteric metal, from the group between the alkaline earth metals and hydrogen in the electromotive force series of metals, an alkaline earth metal hydrate, a salt of nitric acid, a salt of a strong base and a weak acid, and an inert filler material.

5. An exothermic chemical composition for use in imparting a wave to a preformed tress of hair upon the addition thereto of moisture, and adapted to simultaneously cause the evolution of ammonia gas, comprising a powdered mixture of an amphoteric metal from the group between the alkaline earth metals and hydrogen in the electromotive force series of metal, a weak alkaline earth metal hydrate, a salt of sodium and a weak acid, a nitrate, and a filler material, said metal being adapted to react with the solution produced as a result of interreaction between said alkaline earth metal hydrate and sodium salt upon the addition of moisture to the composition, said nitrate being adapted to react exothermically with the hydrogen formed as a result of said reaction and thereby produce ammonia gas.

6. An extremely stable exothermic chemical composition for use in imparting a wave to a preformed tress of hair upon the addition of moisture thereto, and evolving ammonia gas during the process comprising a dry comminuted mixture of aluminum metal, calcium hydrate, sodium carbonate, an alkali nitrate, and a filler material.

7. An extremely stable exothermic chemical composition for use in imparting a wave to a preformed tress of hair upon the addition of moisture thereto, and evolving ammonia gas during the process comprising a dry comminuted mixture of aluminum metal, calcium hydrate, sodium carbonate, an alkali nitrate, and a filler material, the constituents of the composition being combined in the following proportions:

```
Aluminum metal _____ approximately 30% by weight
Calcium hydroxide _____ approximately 10% by weight
Nitrate _____ approximately 20% by weight
Sodium carbonate _____ approximately 10% by weight
Filler material _____ approximately 30% by weight
```

8. An extremely stable exothermic chemical composition for imparting a wave to a preformed tress of hair upon the addition of moisture thereto, and adapted to simultaneously cause the evolution of ammonia gas to condition the hair thereby, comprising a comminuted dry mixture of the following:

```
Calcium hydroxide hydrated _ approximately 10% by weight
Aluminum metal _____ approximately 30% by weight
Sodium nitrate _____ approximately 20% by weight
Trisodium phosphate _____ approximately 10% by weight
Filler material _____ approximately 30% by weight
```

SAMUEL GRANT.